United States Patent
Tiwari et al.

(10) Patent No.: US 9,950,392 B2
(45) Date of Patent: Apr. 24, 2018

(54) FORMING ONE OR MORE APERTURES IN A FIBER-REINFORCED COMPOSITE OBJECT WITH A LASER

(71) Applicant: Rohr, Inc., Chula Vista, CA (US)

(72) Inventors: Sean Tiwari, Glendora, CA (US); Song Chiou, Cerritos, CA (US)

(73) Assignee: Rohr, Inc., Chula Vista, CA (US)

( * ) Notice: Subject to any disclaimer, the term of this patent is extended or adjusted under 35 U.S.C. 154(b) by 723 days.

(21) Appl. No.: 14/196,727

(22) Filed: Mar. 4, 2014

(65) Prior Publication Data

US 2016/0136760 A1  May 19, 2016

(51) Int. Cl.
| | | |
|---|---|---|
| *B23K 26/38* | (2014.01) | |
| *B23K 26/388* | (2014.01) | |
| *B23K 26/402* | (2014.01) | |
| *B23K 26/082* | (2014.01) | |
| *B23K 26/382* | (2014.01) | |
| *B23K 26/40* | (2014.01) | |
| *B23K 103/16* | (2006.01) | |
| *B23K 103/00* | (2006.01) | |

(52) U.S. Cl.
CPC .......... *B23K 26/388* (2013.01); *B23K 26/082* (2015.10); *B23K 26/382* (2015.10); *B23K 26/389* (2015.10); *B23K 26/40* (2013.01); *B23K 26/402* (2013.01); *B23K 2203/16* (2013.01); *B23K 2203/50* (2015.10)

(58) Field of Classification Search
CPC .............................. B23K 26/388; B23K 26/384
See application file for complete search history.

(56) References Cited

U.S. PATENT DOCUMENTS

| | | | |
|---|---|---|---|
| 3,742,182 A | 6/1973 | Saunders | |
| 5,741,456 A | 4/1998 | Ayrton | |
| 6,034,349 A | 3/2000 | Ota | |
| 6,541,732 B2 * | 4/2003 | Hirose | B23K 26/0734 |
| | | | 219/121.7 |
| 6,827,180 B2 | 12/2004 | Wilson | |
| 7,486,705 B2 * | 2/2009 | Shah | G01J 11/00 |
| | | | 372/25 |

(Continued)

FOREIGN PATENT DOCUMENTS

GB    2404966 A    2/2005

OTHER PUBLICATIONS

Dhar et al. "A Review on Laser Drilling and its Techniques", Proceedings: International Conference on Advances in Mechanical Engineering—2006, Dec. 1-3, 2006.

(Continued)

*Primary Examiner* — Benjamin A Schiffman
(74) *Attorney, Agent, or Firm* — O'Shea Getz P.C.

(57) ABSTRACT

A process is provided for forming a plurality of apertures in a fiber-reinforced composite object using a laser. The apertures include at least a first aperture and a second aperture. During the process, a scanner head of the laser is operated from a location to selectively scan a laser beam over the object to form a first portion of the first aperture and to form a first portion of the second aperture. The scanner head is also operated from the location to selectively scan the laser beam over the object to form a second portion of the first aperture and to form a second portion of the second aperture.

16 Claims, 11 Drawing Sheets

(56) References Cited

U.S. PATENT DOCUMENTS

| | | |
|---|---|---|
| 7,789,037 B2 | 9/2010 | Teulet |
| 8,383,985 B2 | 2/2013 | Twelves, Jr. et al. |
| 8,488,994 B2 | 7/2013 | Hanson et al. |
| 8,525,073 B2 | 9/2013 | Quitter et al. |
| 8,628,715 B2 | 1/2014 | Kakui et al. |
| 2003/0042657 A1 | 3/2003 | Dublineau et al. |
| 2009/0045009 A1* | 2/2009 | Chiou .................. G10K 11/168 181/290 |
| 2009/0200275 A1 | 8/2009 | Twelves, Jr. et al. |
| 2009/0242525 A1* | 10/2009 | O'Brien ................ B23K 26/16 219/121.68 |
| 2009/0242529 A1 | 10/2009 | Groll et al. |
| 2012/0164322 A1 | 6/2012 | Tuelet |
| 2012/0228807 A1 | 9/2012 | Teulet |
| 2013/0154159 A1 | 6/2013 | Noel et al. |
| 2013/0277891 A1 | 10/2013 | Teulet |

OTHER PUBLICATIONS

EP search report for EP15157461.3 dated Jun. 13, 2016.

\* cited by examiner

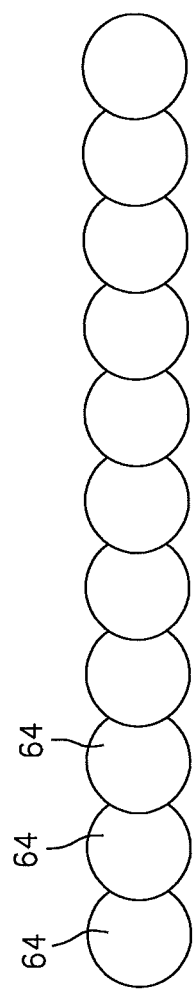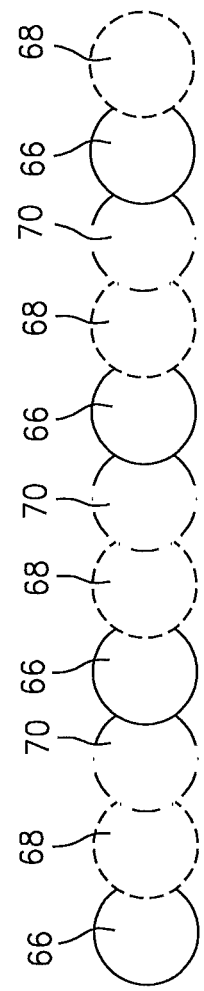

FORMING ONE OR MORE APERTURES IN A FIBER-REINFORCED COMPOSITE OBJECT WITH A LASER

BACKGROUND OF THE INVENTION

1. Technical Field

This disclosure relates generally to laser machining and, more particularly, to forming one or more apertures in a fiber-reinforced composite object with a laser.

2. Background Information

An aircraft propulsion system may include a nacelle with an inner fixed structure (IFS). This inner fixed structure may include two "clam-shell" halves. An upper side of each of these IFS halves may be pivotally attached to an engine pylon. Lower sides of the IFS halves may be connected together or to a divider by one or more latches.

The inner fixed structure is configured to form at least a portion of a bypass gas path between a fan section of the propulsion system and a bypass nozzle of the propulsion system. The inner fixed structure may also be configured to attenuate noise generated by the propulsion system and, more particularly, noised generated by the fan section. Each of the IFS halves, for example, may include one or more acoustic panels located along the bypass gas path. Each of these acoustic panels is typically provided with a plurality of internal chambers, which may be configured as resonators. An inner barrel of an inlet portion of the nacelle may also or alternatively include one or more of such acoustic panels. This inner barrel may form at least a portion of a gas path adjacent and/or through the fan section.

A typical acoustic panel includes a porous (e.g., a honeycomb) core bonded between opposing face sheets (e.g., skins). One of the face sheets is non-perforated. The other one of the face sheets, in contrast, is perforated with a plurality of through-holes. These through-holes provide pathways for sound waves to travel into the core for noise attenuation through, for example, Helmholtz resonance.

In a continuing effort to reduce propulsion system weight, at least the perforated face sheet may be constructed from of relatively light weight fiber-reinforced composite material. Forming through-holes in such a composite material, however, may be time consuming and expensive. In particular, a typical fiber-reinforced composite material may locally delaminate when subjected to heat generated by a typical rapid laser drilling process. Therefore, the through-holes in a fiber-reinforced composite face sheet are generally formed via mechanical drilling and/or media blasting.

There is a need in the art for improved processes for forming through-holes in a fiber-reinforced composite object.

SUMMARY OF THE DISCLOSURE

According to an aspect of the invention, a process is provided for forming a plurality of apertures in a fiber-reinforced composite object using a laser. The apertures include at least a first aperture and a second aperture. During the process, a scanner head of the laser is operated from a location to selectively scan a laser beam over the object to form a first portion of the first aperture and to form a first portion of the second aperture. The scanner head is also operated from the location to selectively scan the laser beam over the object to form a second portion of the first aperture and to form a second portion of the second aperture.

According to another aspect of the invention, a process is provided for forming a plurality of apertures in a fiber-reinforced composite object using a laser. The process includes: (i) moving a scanner head of the pulsed laser to a first location; (ii) forming a first portion of a first aperture in an array of apertures using a laser beam directed from the scanner head at the first location; (iii) sequentially forming a respective first portion of each remaining aperture in the array using a laser beam directed from the scanner head at the first location; (iv) returning to form a second portion of the first aperture in the array using the laser beam directed from the scanner head at the first location after a sufficient amount of time to allow the material immediately surrounding the perimeter of the first aperture to cool so as to not build up enough heat from the laser cutting to cause high temperatures resulting in delamination; and (v) sequentially forming a respective second portion of each remaining aperture in the array using a laser beam directed from the scanner head at the first location.

According to still another aspect of the invention, a process is provided for forming a plurality of apertures in a fiber-reinforced composite object using an infrared pulsed fiber laser. The apertures include a first aperture. During the process, an infrared pulsed laser beam is trepanned using a scanner head of the infrared pulsed fiber laser to form a first portion of the first aperture. The infrared pulsed laser beam is trepanned using the scanner head to form a second portion of the first aperture. Material of the object proximate the first portion of the first aperture is cooled between the formation of the first and the second portions of the first aperture.

During the process, the laser beam may be trepanned to form the first portion of the first aperture.

During the process, the laser beam may be moved along a spiral trajectory to form the first portion of the first aperture.

During the process, the laser beam may be moved along a circular trajectory to form the second portion of the first aperture.

During the process, the scanner head may be operated to provide the laser beam with a first focal length during the formation of the first portion of the first aperture. The scanner head may also be operated to provide the laser beam with a second focal length during the formation of the second portion of the first aperture. The second focal length may be different than the first focal length.

During the process, the scanner head may be operated to change a focal length of the laser beam during the formation of the first aperture.

During the process, the scanner head may be moved from the location to a second location. The scanner head may be operated from the second location to selectively scan the laser beam over the object to form a first portion of a third of the apertures and to form a first portion of a fourth of the apertures. The scanner head may be operated from the second location to selectively scan the laser beam over the object to form a second portion of the third of the apertures and to form a second portion of the fourth of the apertures.

The laser may be configured as or otherwise include a pulsed fiber laser.

The laser may be configured as or otherwise include an infrared fiber laser.

The object may be configured as or otherwise include a carbon fiber composite object.

The object may be configured as or otherwise include a skin for an acoustic panel of a turbine engine.

The process may also include: (i) moving the scanner head to a second location; (ii) forming a first portion of a first aperture in a second array of apertures using the laser beam directed from the scanner head at the second location; (iii)

sequentially forming a respective first portion of each remaining aperture in the second array using a laser beam directed from the scanner head at the second location; (iv) returning to form a second portion of the first aperture in the second array using the laser beam directed from the scanner head at the second location after a sufficient amount of time to allow the material immediately surrounding the perimeter of the first aperture to cool so as to not build up enough heat from the laser cutting to cause high temperatures resulting in delamination; and (v) sequentially forming a respective second portion of each remaining aperture in the second array using a laser beam directed from the scanner head at the second location.

During the process, the infrared pulsed laser beam may be trepanned using the scanner head to form a first portion of a second of the apertures. The first portion of the second of the apertures may be formed between the formation of the first and the second portions of the first aperture.

The foregoing features and the operation of the invention will become more apparent in light of the following description and the accompanying drawings.

BRIEF DESCRIPTION OF THE DRAWINGS

FIGS. 6-14 are illustrations of trajectories of a laser beam (e.g., a pulse laser beam) during formation of one of the apertures;

DETAILED DESCRIPTION OF THE INVENTION

Figure 1:
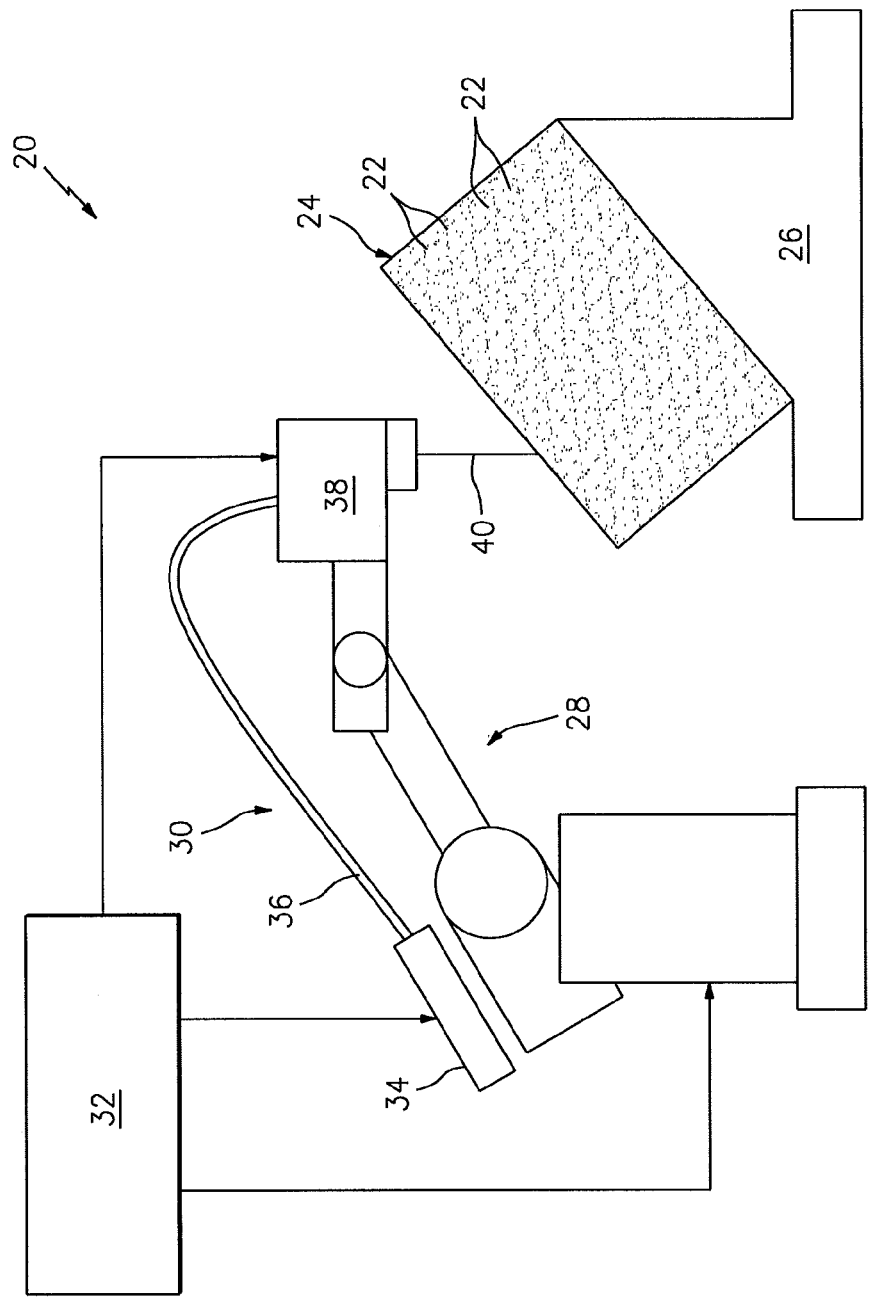
FIG. 1 is a block diagram of a system for forming one or more apertures in a fiber-reinforced composite object.

FIG. 1 is a block diagram of system 20 for forming one or more apertures 22 in at least one fiber-reinforced composite object 24. This system 20 includes a base 26, a manipulator 28 and a laser 30. The system 20 also includes a controller 32 in signal communication (e.g., hardwired and/or wirelessly coupled) with one or more of the system components 28 and 30.

The base 26 is adapted to support the object 24. The base 26 may include a jig to which the object 24 may be attached. The object 24, for example, may be mechanically fastened to the jig. The object 24 may also or alternatively be bonded to the jig. The jig may be adapted to orientate the object 24 at an angle relative to a gravitational horizon as illustrated in FIG. 1. Of course, various other types and configurations of bases are known in the art, and the system 20 is not limited to including any particular ones thereof.

The manipulator 28 (e.g., a multi-axis manipulator) is adapted to move at least one component (e.g., a scanner head) of the laser 30 to various locations around (or to a side of) the object 24. The manipulator 28 may also be adapted to move the at least one component to various locations within the object 24; e.g., within a bore of the object 24. The manipulator 28 of FIG. 1, for example, is configured as a six-axis robotic arm. Of course, various other types and configurations of manipulators are known in the art, and the system 20 is not limited to including any particular ones thereof.

The laser 30 is adapted to form (e.g., cut) one or more apertures 22 in the object 24. The laser 30 may be configured as an infrared (IR) laser and/or pulsed laser. The laser 30 may also or alternatively be configured as a fiber laser. The laser 30 of FIG. 1, for example, is configured as an infrared pulsed fiber laser. The laser 30 includes a laser beam source 34, a length of optical fiber 36, and a scanner head 38.

Figure 2:
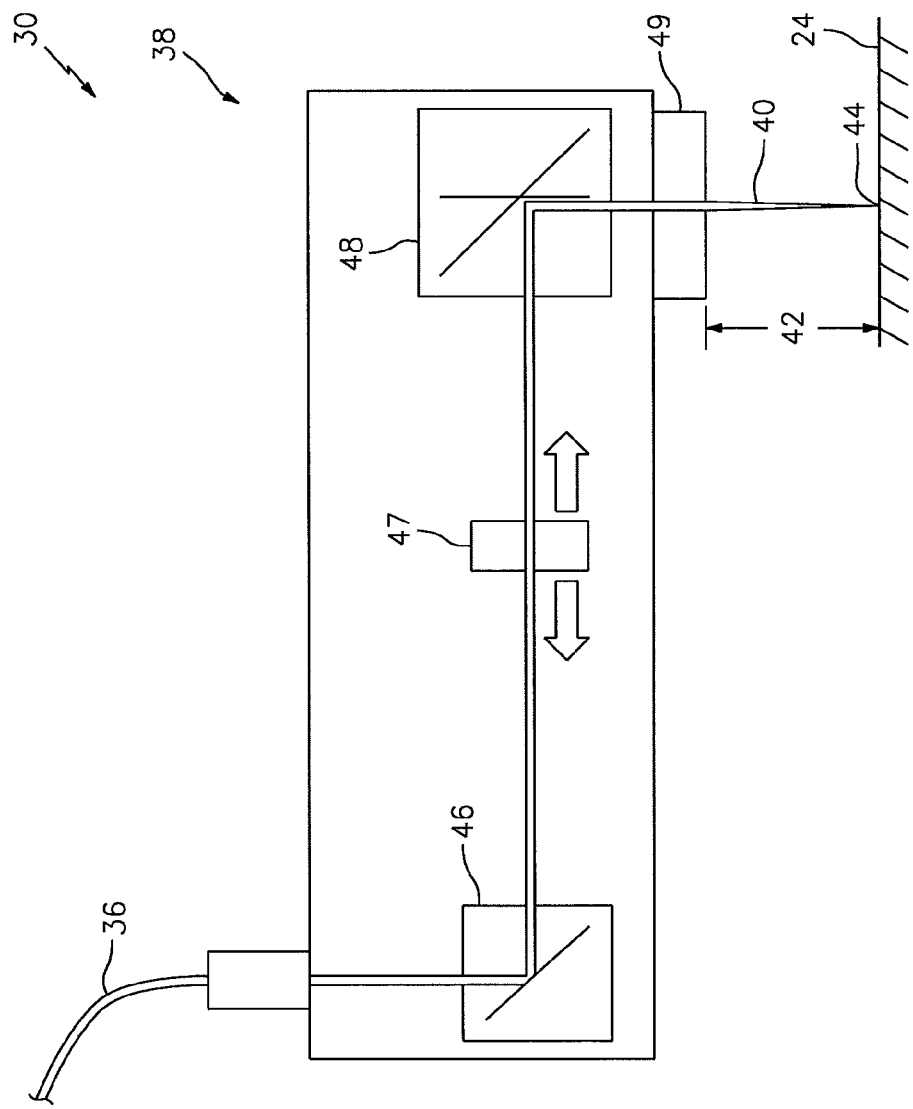
FIG. 2 is a block diagram of a laser scanner head for the system.

The laser beam source 34 is adapted to generate a laser beam 40 (see FIG. 2). The laser beam source 34 may be configured as or otherwise include, for example, a laser diode; e.g., an infrared laser diode.

The optical fiber 36 is adapted to direct the laser beam 40 generated by the laser beam source 34 to the scanner head 38. The optical fiber 36 may be configured as, for example, a length of flexible, hollow glass fiber capable of transmitting the laser beam through reflectance.

Referring to FIG. 2, the scanner head 38 is adapted to receive the laser beam 40 from the optical fiber 36 and scan the laser beam 40 over at least a portion of the object 24. The term "scan" may describe a process of directing a laser beam along one or more paths over an object and/or to one or more discrete points on the object. The scanner head 38 may also be adapted to change a focal length of the laser beam 40 during and/or before/after the scanning. The term "focal length" may describe a distance 42 between the scanner head 38 and a focal point 44 of the laser beam 40, which point is where the laser beam converges to its smallest diameter and greatest energy density, and is typically where the laser beam 40 hits an object.

Figure 3:
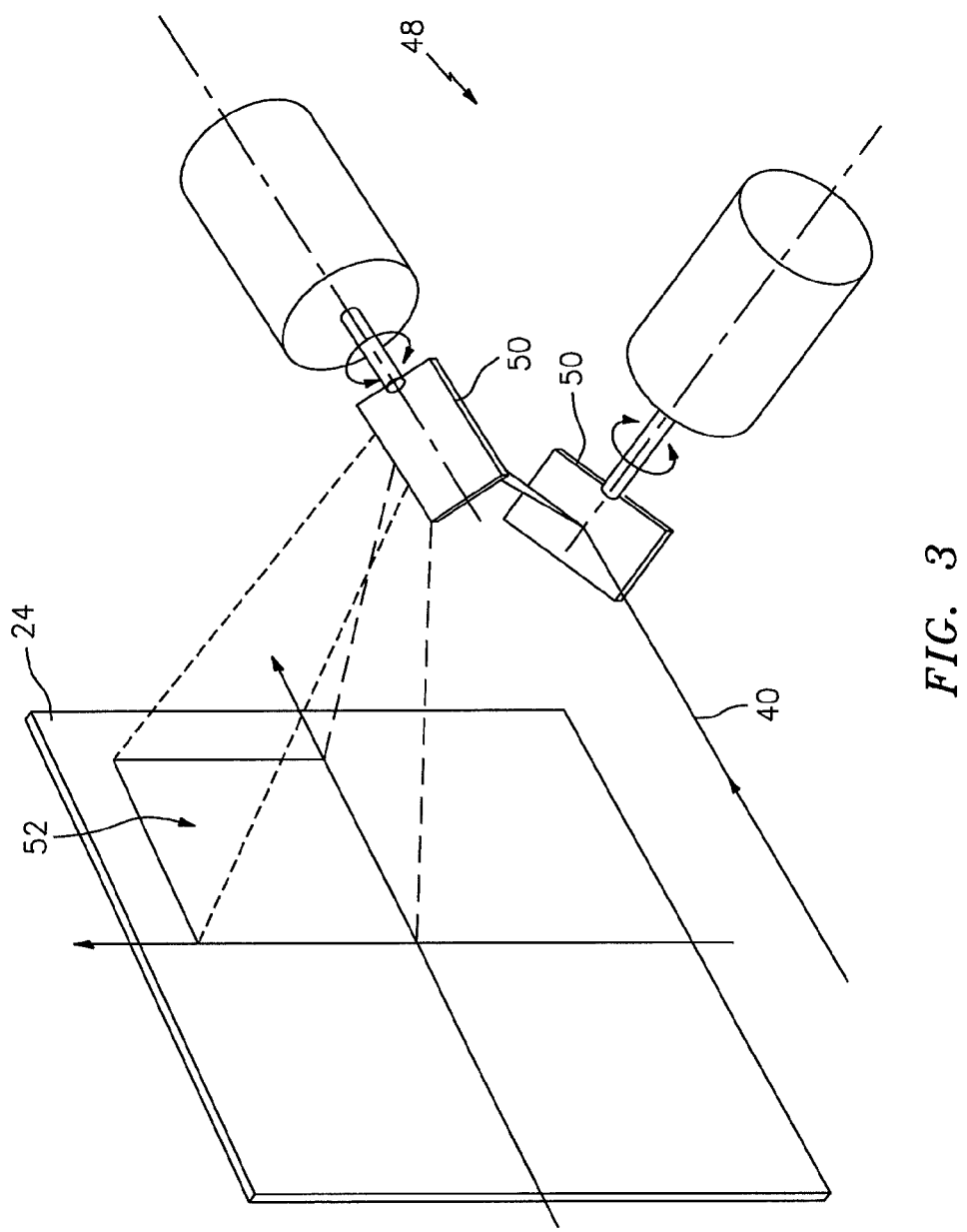
FIG. 3 is a perspective block diagram illustration of an optical element for the scanner head.

The scanner head 38 of FIG. 2 includes a plurality of optical elements 46-49. One or more of these optical elements 46-49 may each be adapted to filter, focus and/or redirect the laser beam 40. The first element 46, for example, may be configured as a bending mirror. The first element 46 is adapted to direct the laser beam 40 output from the optical fiber 36 through the second element 47 and to the third element 48. The second element 47 may be configured as a lens, which translates back and forth between the optical elements 46 and 48. The second element 47 is adapted to change a focal length of the laser beam 40. Referring to FIG. 3, the third element 48 may include one or more (e.g., single-axis) galvo mirrors 50. The third element 48 is adapted to direct the laser beam 40 through the fourth element 49 (see FIG. 2) to various points on the object 24 within a scan area 52; e.g., an area on the object 24 where the laser beam 40 may be directed without moving the scanner head 38. Referring again to FIG. 2, the fourth element 49 may be configured as a stationary focusing lens. The fourth element 49 is adapted to focus the laser beam 40 to the focal point 44.

Examples of a suitable scanner head include a hurrySCAN® scan head, a hurrySCAN® II scan head, and hurrySCAN® III scan head, which are manufactured by SCANLAB Aktiengesellschaft of Puchheim, Germany. Of course, various other types and configurations of scanner heads and optical elements are known in the art, and the system 20 is not limited to including any particular ones thereof.

Referring to FIG. 1, the controller 32 (e.g., a processing system) is adapted to signal one or more of the system components 28 and 30 to perform at least a portion of the process described below. The controller 32 may be implemented with a combination of hardware and software. The hardware may include memory and one or more single-core and/or multi-core processors. The memory may be a non-transitory computer readable medium, and adapted to store the software (e.g., program instructions) for execution by the processors. The hardware may also include analog and/or digital circuitry other than that described above.

Figure 4:
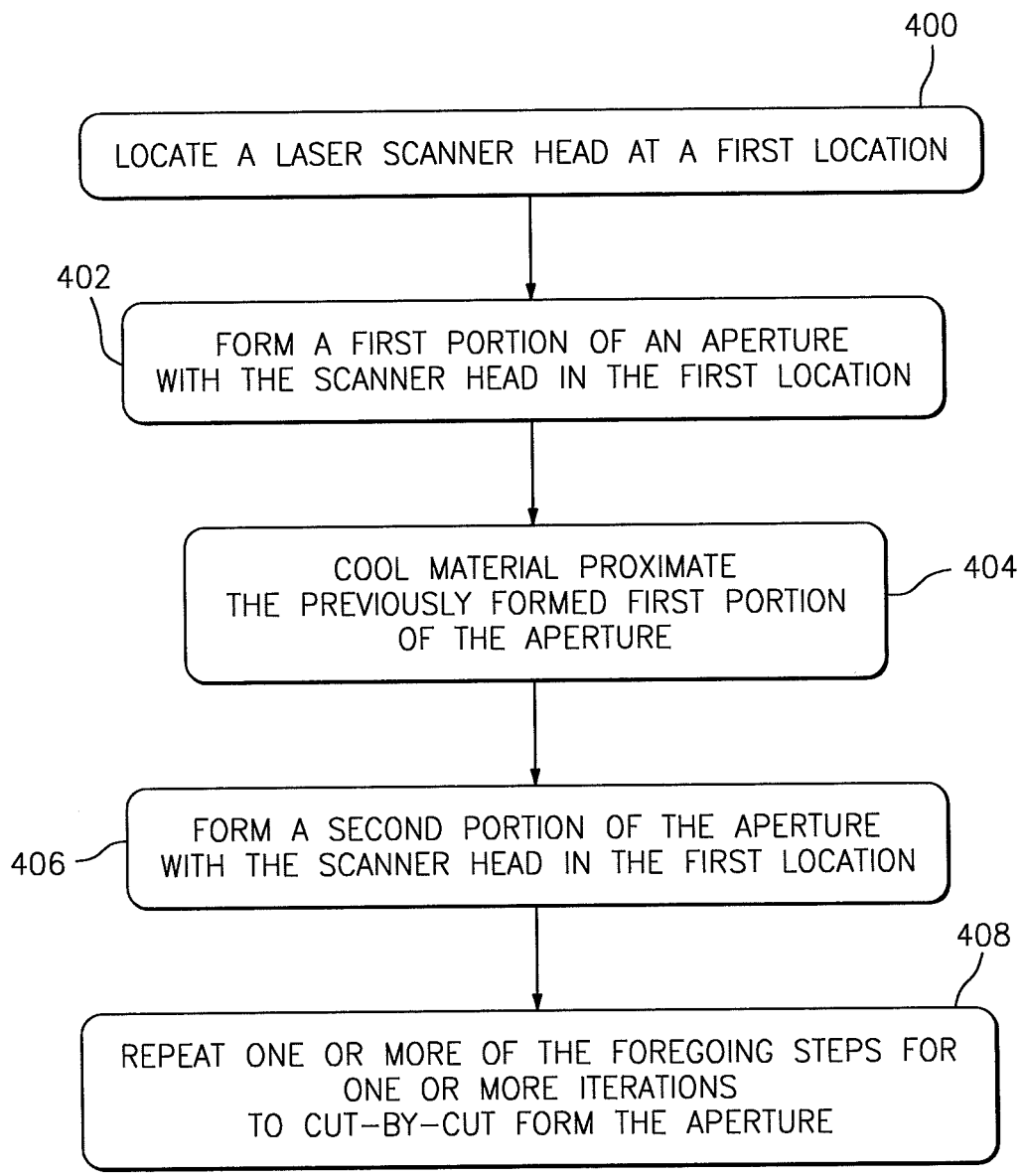
FIG. 4 is a flow diagram of a process for forming at least one of the apertures in the object.

FIG. 4 is a flow diagram of a process for forming an aperture 22 in at least one fiber-reinforced composite object 24 using a manufacturing system such as the system 20 of FIG. 1. Examples of an aperture include a circular through-hole and a non-circular through-hole. Other examples of an aperture include a recess and a pocket. The process of FIG. 4 and the system 20, however, may also or alternatively provide one or more apertures other than the exemplary types and configurations described above.

The object 24 may be composed of or otherwise include carbon fiber composite material, fiberglass, and/or any other type of fiber-reinforced composite material. The object 24 may be configured as a component of a turbine engine (e.g., an aircraft propulsion system). For example, the object 24 may be configured as a perforated face sheet or skin of an acoustic panel for a turbine engine nacelle. Such an acoustic panel may include a porous (e.g., honeycomb) core, and may be included as part of an inner barrel, an inner fixed structure (IFS) of the turbine engine nacelle, a blocker door, or the like. The process of FIG. 4 and the system 20, however, may also or alternatively form one or more apertures in fiber-reinforced composite objects other than those described above or included in a turbine engine.

In step 400, referring to FIG. 1, the scanner head 38 is located at a first location relative to the object 24. The controller 32, for example, may signal the manipulator 28 to move the scanner head 38 from a starting position to the first location.

Figure 5:
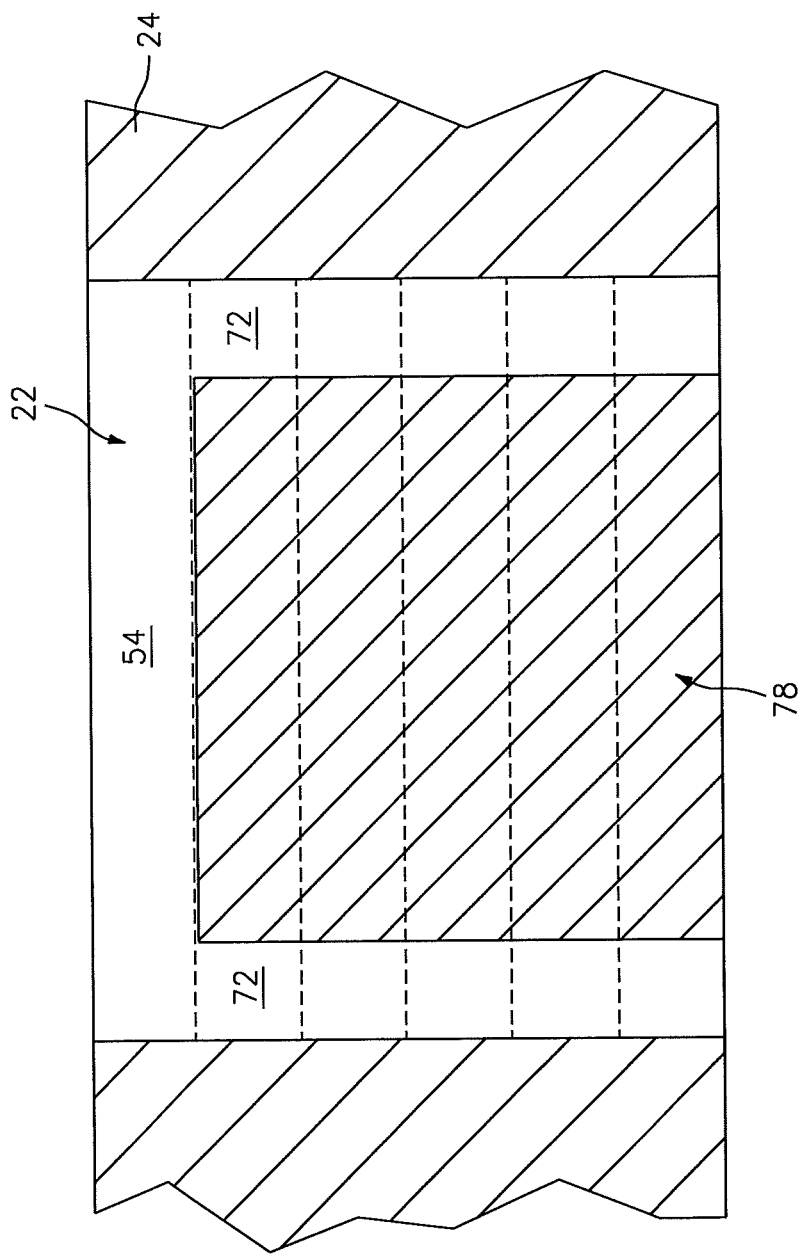
FIG. 5 is a sectional illustration of a portion of the object during formation of one of the apertures.

In step 402, referring to FIGS. 1 and 5, a first portion 54 of the aperture 22 is formed with the scanner head 38 in the first location. The controller 32, for example, signals the laser beam source 34 to generate the laser beam 40 (e.g., an infrared pulsed laser beam). This laser beam 40 is directed from the laser beam source 34 to the scanner head 38 through the optical fiber 36. The controller 32 also signals the scanner head 38 to selectively scan the laser beam 40 over the object 24 to form the first portion 54 of the aperture 22.

Figure 6:
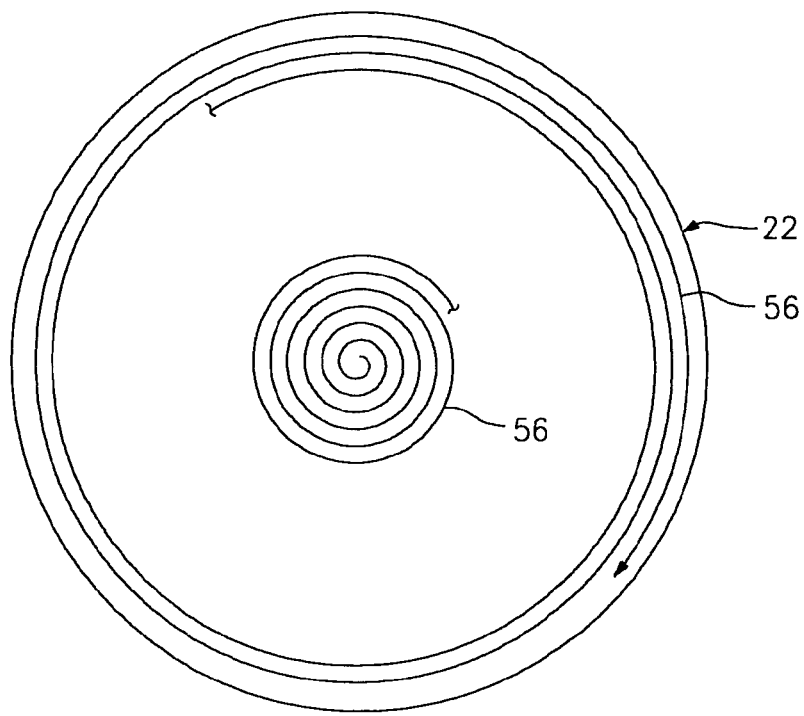

The first portion 54 may be a layer cut; e.g., a cylindrical cut into the object 24. For example, referring to FIGS. 1 and 6, the scanner head 38 may direct the laser beam 40 along a generally spiral trajectory 56 to cut away a cylindrical portion of the object 24. The laser beam 40 may start at a center of the to-be-formed aperture 22 and spiral out as illustrated in FIG. 6. Alternatively, the laser beam 40 may start at a point on a perimeter of the to-be-formed aperture 22 and spiral in.

Figure 7:
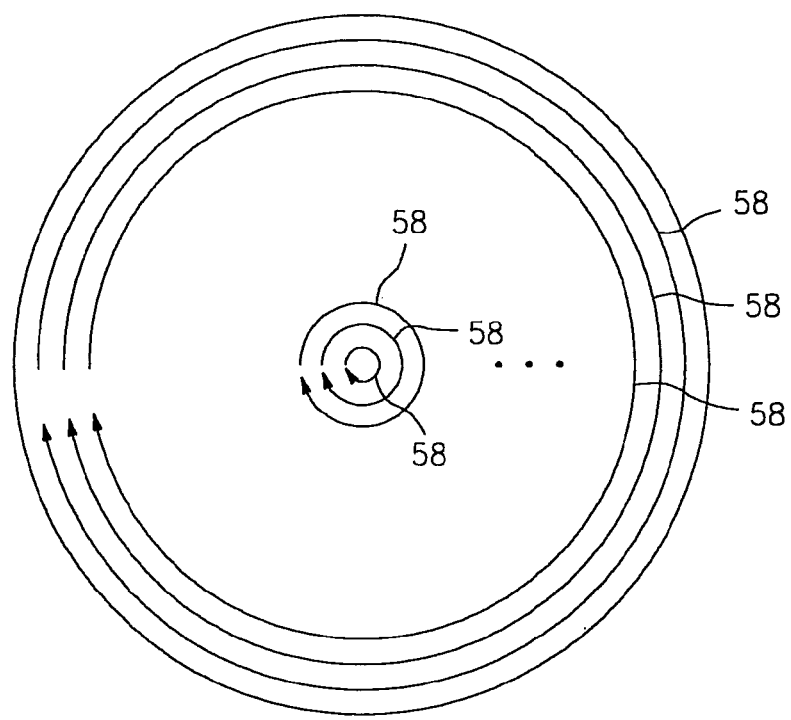

In another example, referring to FIGS. 1 and 7, the scanner head 38 may direct the laser beam 40 along a plurality of circular trajectories 58 to respectively cut away discrete annular portions of the object 24, thereby accumulatively cutting away a cylindrical portion of the object 24. The laser beam 40 may start cutting the annular portions into the object 24 at the perimeter of the to-be-formed aperture 22 and move radially inward. Alternatively, the laser beam 40 may start cutting the annular portions into the object 24 at the center of the to-be-formed aperture 22 and move radially outward.

One or more of the cuts into the object 24 during the step 402 may each be formed using a trepanning technique. For example, referring to FIGS. 1 and 8-10, the laser 30 may pulse the laser beam 40 at various points 60 along the laser beam 40 trajectory. Each of these pulses may form a respective sub-cut (e.g., divot) in the object 24, which collectively form the spiral cut (see FIG. 6) or a respective one of the annular cuts (see FIG. 7) in the object 24.

Figure 8:
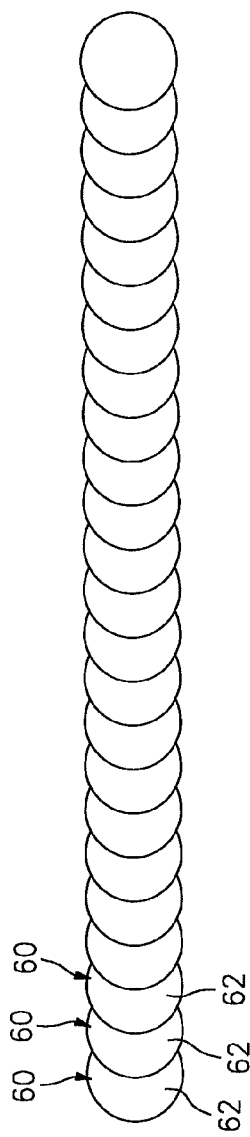
Figure 9:
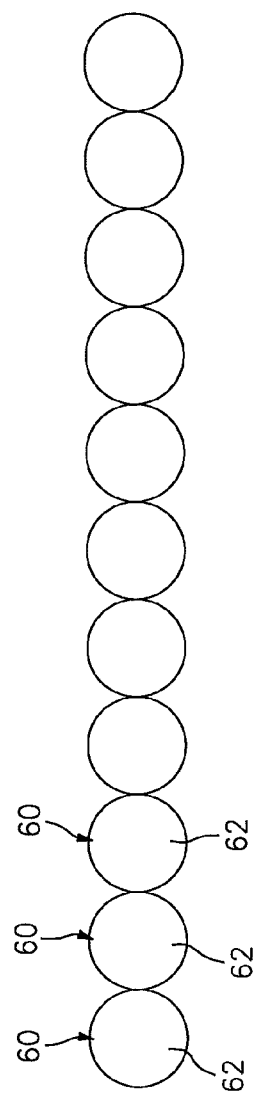
Figure 10:
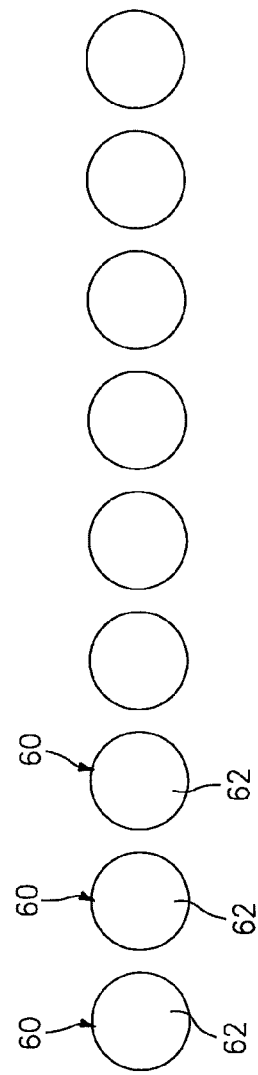

Areas of incidence 62 of at least some of the laser beam 40 pulses may overlap as illustrated in FIG. 8. The term "area of incidence" may describe an area on a surface of the object 24 that is covered by the laser beam 40 during a pulse. The areas of incidence 62 of at least some of the laser beam 40 pulses may also or alternatively be adjacent to one another as illustrated in FIG. 9. The areas of incidence 62 of at least some of the laser beam 40 pulses may also or alternatively be spaced apart from one another as illustrated in FIG. 10 where, for example, an area of the sub-cut is greater than the respective area of incidence 62.

During trepanning, the laser beam 40 may take one or more passes along its trajectory (e.g., trajectory 56 or 58) to make a respective cut into the object 24. For example, referring to FIG. 11, the laser beam 40 may form each of the sub-cuts 64 during a single pass along its trajectory. Alternatively, referring to FIG. 12, the laser beam 40 may form a first set of the sub-cuts 66 during a first pass along its trajectory. The laser beam 40 may form a second set of the sub-cuts 68 during a second pass along its trajectory. The laser beam 40 may form a third set of the sub-cuts 70 during a third pass along its trajectory. By forming the cut with a plurality of passes of the laser beam 40, portions of the object 24 material proximate previously formed sub-cuts 66, 68 and/or 70 may have time to cool before being subjected to the heat from another laser beam 40 pulse. This local cooling may help to reduce or prevent delamination of the object 24 material during the step 402. It is worth noting, additional or fewer passes of the laser beam 40 may be made to form the cut than that described above depending how quickly the laser beam 40 is moving along its trajectory, how long respective portions of the object 24 material is locally cooled, and/or various other laser beam parameters such as, for example, pulse length, pulse frequency, laser beam intensity, etc.

In step 404, a portion of the object 24 material proximate the previously formed first portion 54 of the aperture 22 is cooled. The controller 32, for example, may wait a predetermined period of time before performing step 406 described below. This cooling may further help to reduce or prevent delamination of the object 24 material during the process of FIG. 4.

In step 406, referring to FIGS. 1 and 5, a second portion 72 of the aperture 22 is formed with the scanner head 38 in the first location. The controller 32, for example, signals the laser beam source 34 to generate the laser beam 40 (e.g., the infrared pulsed laser beam). This laser beam 40 is directed from the laser beam source 34 to the scanner head 38 through the optical fiber 36. The controller 32 also signals the scanner head 38 to selectively scan the laser beam 40 over the object 24 to form the second portion 72 of the aperture 22. This second portion 72 of the aperture 22 may extend into the object 24 from the first portion 54 of the aperture 22 as illustrated in FIG. 5.

Figure 13:
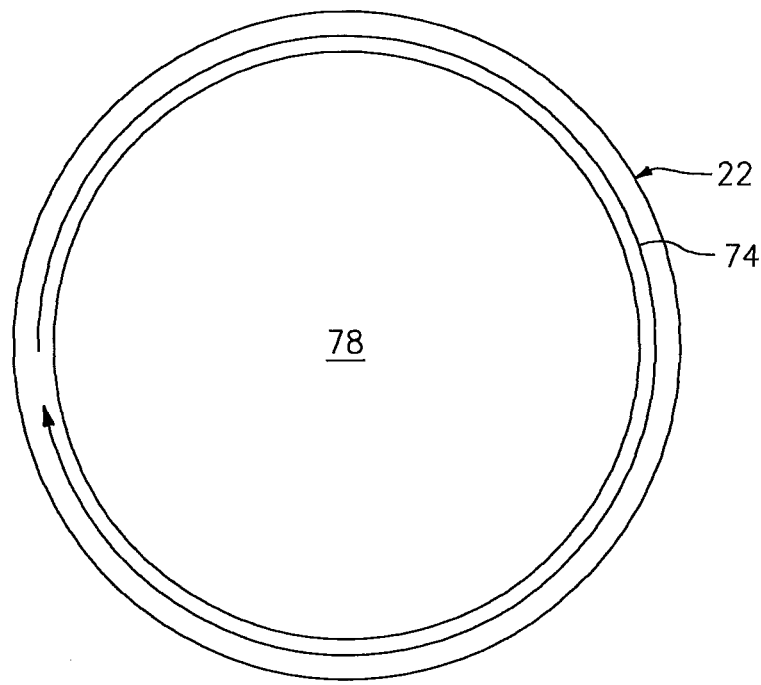
Figure 14:
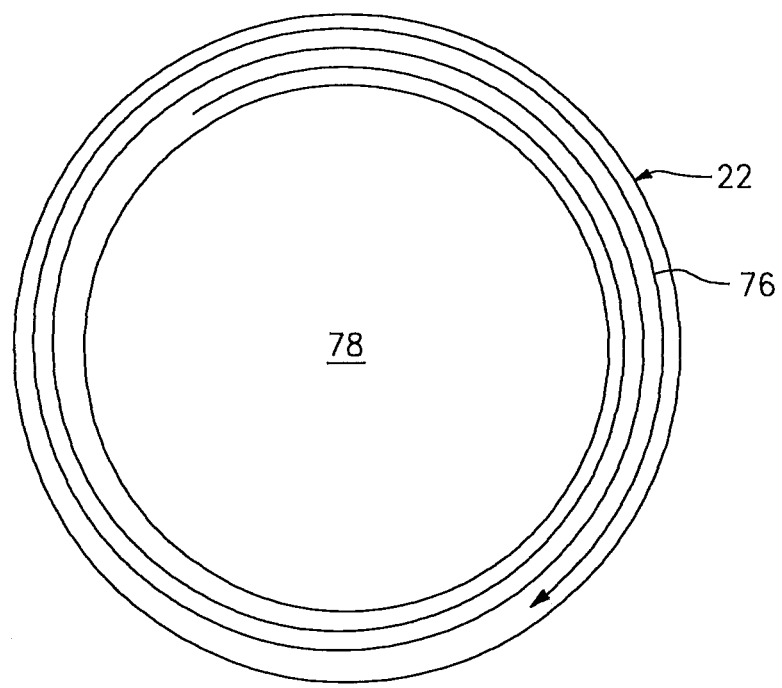

The second portion 72 may be an annular cut; e.g., an annular cut into the object 24. For example, referring to FIGS. 1 and 13, the scanner head 38 may direct the laser beam 40 along at least one circular trajectory 74 along the perimeter of the to-be-formed aperture 22, thereby cutting away an annular portion of the object 24. Alternatively, referring to FIGS. 1 and 14, the scanner head 38 may direct the laser beam 40 along a generally spiral trajectory 76. This spiral trajectory 76 may spiral partially in from the perimeter of the to-be-formed aperture 22 such that the laser beam 40 cuts away an annular portion of the object 24. Of course, the laser beam 40 may also spiral out to cut away the annular portion of the object 24. Each of the foregoing cuts may be formed using a trepanning technique as described above with respect to the step 402.

In step 408, one or more of the foregoing steps (e.g., the steps 404 and 406) may be repeated for one or more iterations in order to completely form the aperture 22 in the object 24 cut-by-cut. Upon completion of this step, referring to FIG. 5, an inner core 78 formed by the foregoing cutting steps may be completely detached from the object 24. As a result, the inner core 78 may fall away or may be moved away (e.g., via a vacuum) from the object 24, thereby leaving the completely formed aperture 22 behind.

In some embodiments, the step 406 and/or one or more of its repetitions (during the step 408) may each be replaced with a step similar to that described above with respect to the step 402. In this manner, the aperture 22 may be found in the object 24 cut-by-cut with a smaller inner core 78 or without the inner core 78. Alternatively, the step 402 may be replaced with a step similar to that described above with respect to the step 406.

In some embodiments, referring to FIGS. 1 and 2, the focal length of the laser beam 40 may be changed between the steps 402 and 406. In this manner, the laser beam 40 may be adjusted for the new distance between the scanner head 38 (e.g., the optical element 49) and a surface of the object 24 with which the laser beam 40 is incident. For example, the controller 32 may signal the scanner head 38 to translate the optical element 47 towards the right side of FIG. 2 to increase the focal length. In some embodiments, the focal length of the laser beam 40 may also or alternatively be changed during formation of one or more of the portions 54 and/or 72 of the aperture 22.

Figure 15:
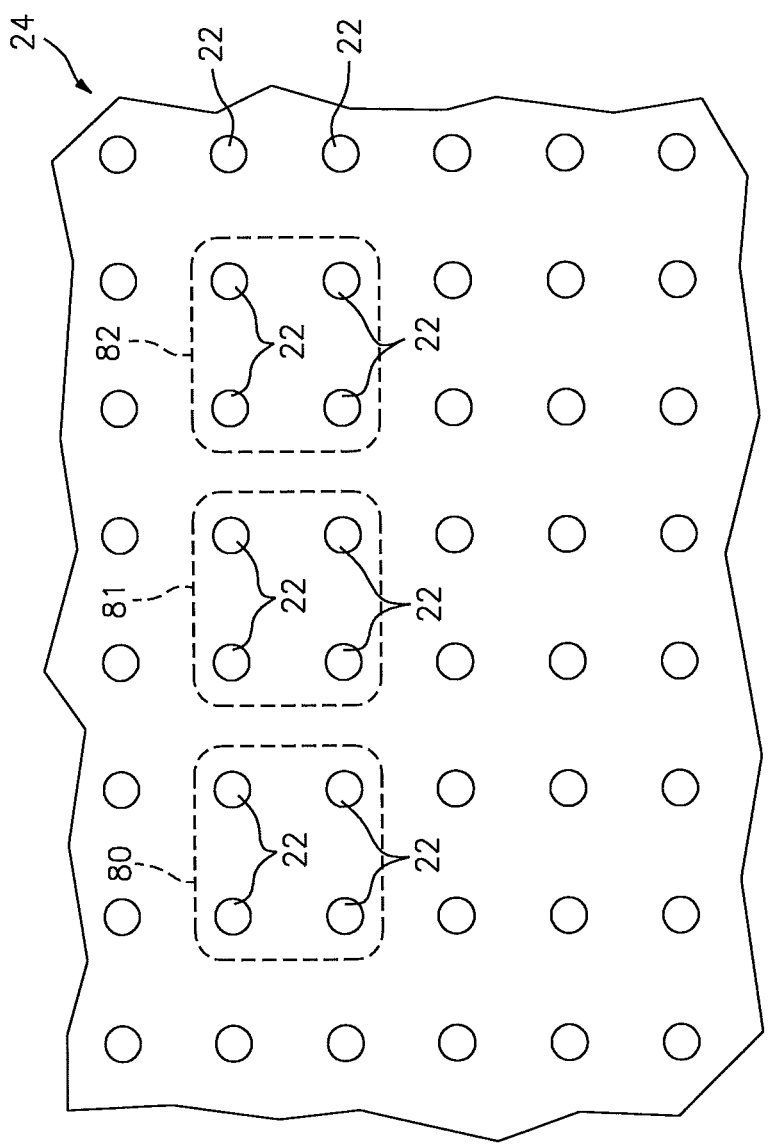
FIG. 15 is an illustration of a side of a portion of the object.
Figure 16:
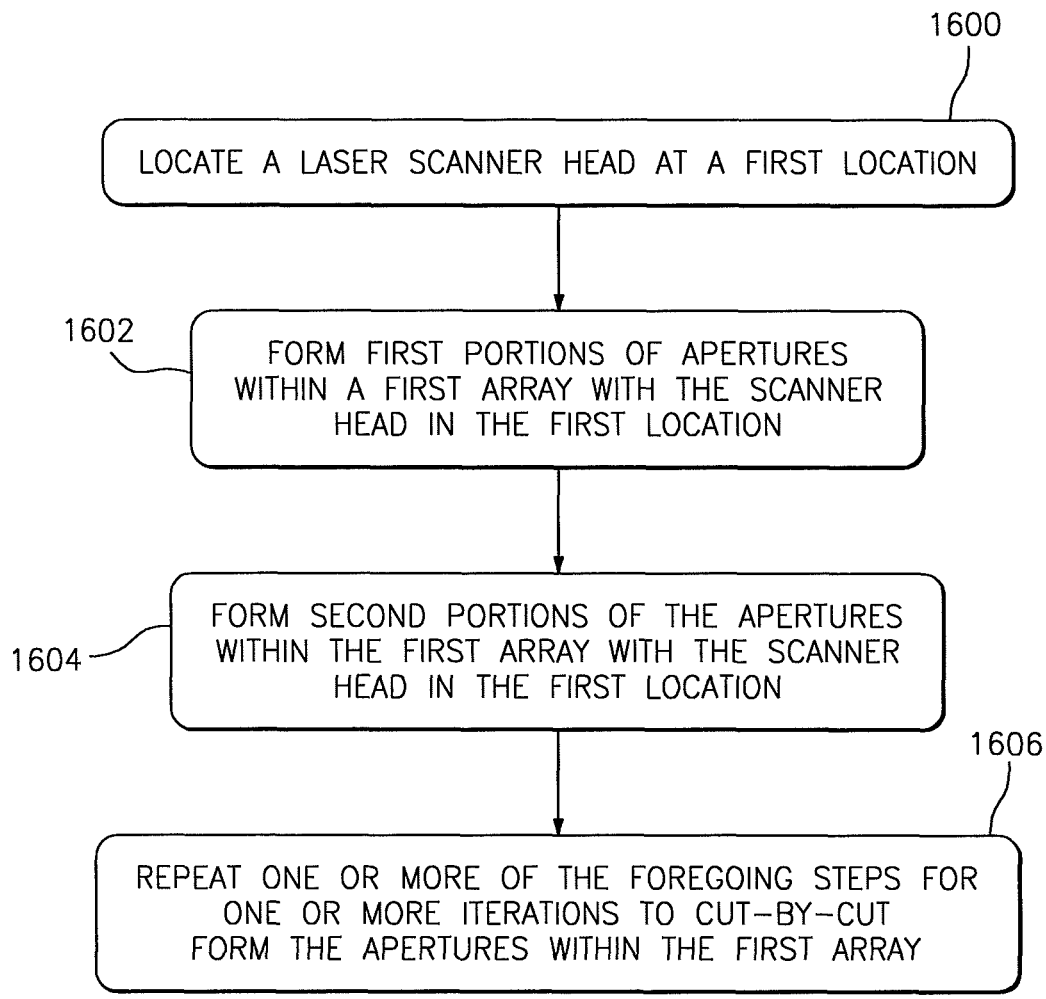
FIG. 16 is a flow diagram of a process for collectively forming the apertures in an array.

In some embodiments, referring to FIG. 15, the object 24 may be configured with a plurality of the apertures 22. Arrays (e.g., arrays 80-82) of these apertures 22 may be collectively formed together. For example, FIG. 16 is a flow diagram of a process for collectively forming the apertures 22 in the first array 80 with the scanner head 38 in a first location; e.g., stationary. It is worth noting, however, that the process of FIG. 16 may be repeated (i) with the scanner head 38 at a second location to form the apertures 22 in the second array 81, (ii) with the scanner head 38 at a third location to form the apertures 22 in the third array 82, etc.

In step 1600, referring to FIG. 1, the scanner head 38 is located at the first location. The controller 32, for example, may signal the manipulator 28 to move the scanner head 38 from a starting position to the first location. The first location of the scanner head 38 may be selected such that the laser beam may be aimed at all the points required to form all of the apertures 22 within a particular array of apertures, such as the first array 80.

In step 1602, referring to FIGS. 1, 5 and 15, first portions 54 of the apertures 22 in the first array 80 are respectively formed with the scanner head 38 in the first location; e.g., stationary. The controller 32, for example, may signal the laser 30 to form the first portion 54 of each aperture 22 in the first array 80 in, a similar manner as described above with respect to the step 402 (or the step 406). It is worth noting, a cooling step similar to the step 404 is performed for the object 24 material proximate each of the to-be-formed apertures 22 while the laser 30 is forming the first portion 54 of the other apertures 22 in the first array 80. The number of apertures in the array, and the amount of time spent forming each first portion 54, may be selected such that the first aperture 22 (and each subsequent aperture 22) is allowed to cool sufficiently between forming the first portion 54 and the second portion 72 (and each subsequent portion of the aperture). The material surrounding aperture 22 should cool adequately such that heat does not build up enough to create a high temperature that will result in delamination or other degradation. Likewise, the material should not cool too much either. Too much cooling can slow down the cutting process.

In step 1604, second portions 72 of the apertures 22 in the first array 80 are respectively formed with the scanner head 38 in the first location. The controller 32, for example, may signal the laser 30 to form the second portion 72 of each aperture 22 in the first array 80 in a similar manner as described above with respect to the step 406 (or the step 402). Again, a cooling step similar to the step 404 is performed for the object 24 material proximate each of the to-be-formed apertures 22 while the laser 30 is forming the second portion 72 of the other apertures 22 in the first array 80.

In step 1606, at least one of the foregoing steps (e.g., the step 1604) may be repeated for one or more iterations in order to completely form each aperture 22 in the first array 80 cut-by-cut. Upon completion of this step, inner cores 78 formed by the foregoing cutting steps may be completely detached from the object 24. As a result, the inner cores 78 may fall away or may be moved away from the object 24, thereby leaving the completely formed apertures 22 of the first array 80 behind.

In some processes, a laser scanner head may be moved to a new discrete location for formation of each aperture in an object. The scanner head, for example, may move to a first location for formation of a first of the apertures, move to a second location for formation of a second of the apertures, etc. Such scanner head movement, however, requires a certain period of time to move the scanner head with a manipulator as well as a certain period of time for the manipulator to settle (e.g., become still) after movement. Accumulation of these periods of time during formation of numerous apertures in the object may significantly increase manufacturing time, cost as well as wear-and-tear of the manipulator. In contrast, during the process of FIG. 16, the scanner head 38 may remain substantially stationary at the first location during the formation of the apertures 22 in the first array 80, and only move when transitioning to the process of forming the next array of apertures 22, such as second array 81. The process of FIG. 16, therefore, may reduce manufacturing time and cost of the object 24.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

We claim:

1. A process for forming a plurality of apertures in a fiber-reinforced composite object using a laser, the apertures including at least a first aperture and a second aperture, the process comprising:

operating a scanner head of the laser from a location to selectively scan a laser beam over the object to form a first portion of the first aperture and to form a first portion of the second aperture; and operating the scanner head from the location to selectively scan the laser beam over the object to form a second portion of the first aperture and to form a second portion of the second aperture, wherein the second portion of the first aperture consists of an annular cut into the object, and the first portion of the first aperture comprises a layer cut into the object;

wherein the laser comprises an infrared fiber laser.

2. The process of claim 1, further comprising trepanning the laser beam to form the first portion of the first aperture.

3. The process of claim 1, further comprising moving the laser beam along a spiral trajectory to form the first portion of the first aperture.

4. The process of claim 1, further comprising moving the laser beam along a circular trajectory to form the second portion of the first aperture.

5. The process of claim 1, further comprising:
operating the scanner head to provide the laser beam with a first focal length during the formation of the first portion of the first aperture; and
operating the scanner head to provide the laser beam with a second focal length during the formation of the second portion of the first aperture;
wherein the second focal length is different than the first focal length.

6. The process of claim 1, further comprising operating the scanner head to change a focal length of the laser beam during the formation of the first aperture.

7. The process of claim 1, further comprising:
moving the scanner head from the location to a second location;
operating the scanner head from the second location to selectively scan the laser beam over the object to form a first portion of a third of the apertures and to form a first portion of a fourth of the apertures; and
operating the scanner head from the second location to selectively scan the laser beam over the object to form a second portion of the third of the apertures and to form a second portion of the fourth of the apertures.

8. The process of claim 1, wherein the infrared fiber laser comprises an infrared pulsed fiber laser.

9. The process of claim 1, wherein the object comprises a carbon fiber composite object.

10. The process of claim 1, wherein the object comprises a skin for an acoustic panel of a turbine engine.

11. A process for forming a plurality of apertures in a fiber-reinforced composite object using a laser, the process sequentially comprising:
moving a scanner head of the pulsed laser to a first location;
forming a first portion of a first aperture in an array of apertures using a laser beam directed from the scanner head at the first location;
sequentially forming a respective first portion of each remaining aperture in the array using a laser beam directed from the scanner head at the first location;
returning to form a second portion of the first aperture in the array using the laser beam directed from the scanner head at the first location after a sufficient amount of time to allow material immediately surrounding a perimeter of the first aperture to cool so as to not build up enough heat from the laser cutting to cause high temperatures resulting in delamination; and
sequentially forming a respective second portion of each remaining aperture in the array using a laser beam directed from the scanner head at the first location;
wherein the laser comprises an infrared laser; and
wherein the first portion of the first aperture comprises a layer cut into the object, and the second portion of the first aperture is configured as an annular cut that circumscribes an inner core.

12. The process of claim 11, further comprising:
moving the scanner head to a second location;
forming a first portion of a first aperture in a second array of apertures using the laser beam directed from the scanner head at the second location;
sequentially forming a respective first portion of each remaining aperture in the second array using a laser beam directed from the scanner head at the second location;
returning to form a second portion of the first aperture in the second array using the laser beam directed from the scanner head at the second location after a sufficient amount of time to allow the material immediately surrounding the perimeter of the first aperture to cool so as to not build up enough heat from the laser cutting to cause high temperatures resulting in delamination; and
sequentially forming a respective second portion of each remaining aperture in the second array using a laser beam directed from the scanner head at the second location.

13. A process for forming a plurality of apertures in a fiber-reinforced composite object using an infrared pulsed fiber laser, the apertures including a first aperture, the process comprising:
trepanning an infrared pulsed laser beam using a scanner head of the infrared pulsed fiber laser to form a first portion of the first aperture;
trepanning the infrared pulsed laser beam using the scanner head to form a second portion of the first aperture; and
cooling material of the object proximate the first portion of the first aperture between the formation of the first and the second portions of the first aperture;
wherein the first portion of the first aperture comprises a cylindrical cut into the object, and the second portion of the first aperture consists of an annular cut into the object.

14. The process of claim 13, further comprising:
trepanning the infrared pulsed laser beam using the scanner head to form a first portion of a second of the apertures;
wherein the first portion of the second of the apertures is formed between the formation of the first and the second portions of the first aperture.

15. The process of claim 13, wherein the forming of the second portion leaves behind an inner core, and the annular cut circumscribes the inner core.

16. A process for forming a plurality of apertures in a fiber-reinforced composite object using an infrared pulsed fiber laser, the apertures including a first aperture, the process comprising:
trepanning an infrared pulsed laser beam using a scanner head of the infrared pulsed fiber laser to form a first portion of the first aperture;
trepanning the infrared pulsed laser beam using the scanner head to form a second portion of the first aperture; and cooling material of the object proximate the first portion of the first aperture between the formation of the first and the second portions of the first aperture;
wherein the first portion of the first aperture comprises a layer cut into the object, and the second portion of the first aperture consists of an annular cut into the object.

* * * * *

UNITED STATES PATENT AND TRADEMARK OFFICE
CERTIFICATE OF CORRECTION

PATENT NO. : 9,950,392 B2  
APPLICATION NO. : 14/196727  
DATED : April 24, 2018  
INVENTOR(S) : Sean Tiwari and Song Chiou Page 1 of 1

It is certified that error appears in the above-identified patent and that said Letters Patent is hereby corrected as shown below:

In the Specification

Column 7, Line 21, please delete "found" and insert --formed--.

Signed and Sealed this  
Fifth Day of June, 2018

Andrei Iancu  
*Director of the United States Patent and Trademark Office*